Nov. 23, 1937. F. T. HOLMES 2,099,849
ROTATIONAL TRIGGER MECHANISM
Filed Feb. 21, 1936

Inventor:
Frederick T. Holmes,
By Jas. C. Wobensmith
Attorney.

Patented Nov. 23, 1937

2,099,849

UNITED STATES PATENT OFFICE 2,099,849

ROTATIONAL TRIGGER MECHANISM

Frederick T. Holmes, Waterbury, Conn.

Application February 21, 1936, Serial No. 65,171

7 Claims. (Cl. 264—13)

This invention relates to rotational trigger mechanism, that is to say, to a device adapted for a variety of uses, as, for example, when used with other apparatus, to bring about an indication when a predetermined speed of a moving device has been exceeded, or to prevent said moving device from exceeding a predetermined rotational speed.

The principal object of the invention is to provide apparatus which is so constructed and arranged that the same will be actuated whenever a predetermined speed of a moving device has been exceeded, thereby to actuate other mechanism, such, for example, as an indicator or control mechanism.

It is a further object of the invention to provide an indication or control initiating unit in which the exceeding of a predetermined torque is effective and available for the purpose of indication or control.

It is a further object of the invention to provide a unit of this character in which the value of the predetermined torque may be varied.

Other objects of the invention will appear from the specification and claims.

Figure 1:
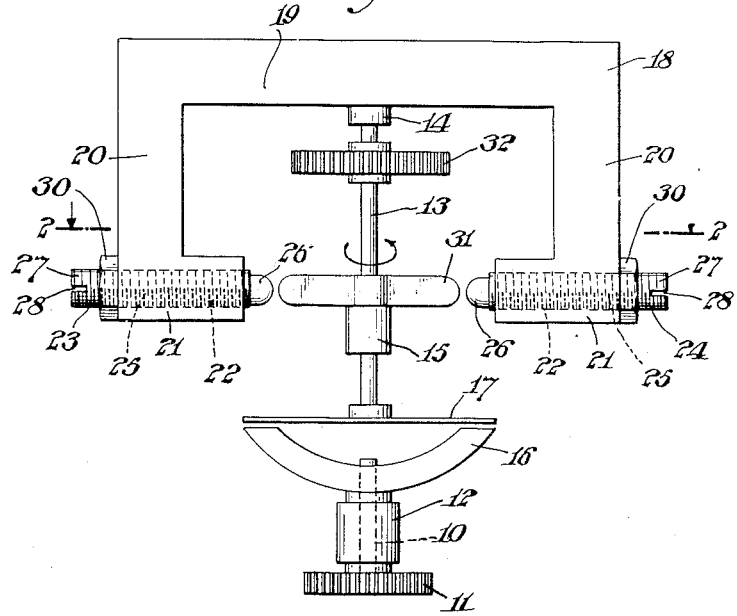
Figure 2:
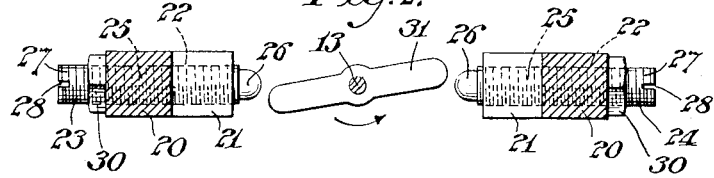

The nature and characteristic features of the present invention will be more readily understood from the following description, taken in connection with the accompanying drawing forming part hereof, in which Figure 1 is an elevational view of a unit embodying the main features of the invention, and Fig. 2 is a horizontal sectional view taken approximately on the line 2—2 of Fig. 1.

It will, of course, be understood that the description and drawing herein contained are illustrative merely and that various modifications and changes may be made in the structure disclosed without departing from the spirit of the invention.

Referring more particularly to the drawing in which a preferred embodiment of the invention is illustrated, a drive shaft is shown at 10 and has keyed or otherwise secured thereto for rotation therewith a drive shaft connector 11. The drive shaft connector 11 is shown as comprising a toothed pinion although it will, of course, be understood any other form of connector may be used. The drive shaft 10 is journaled in a suitable bearing 12.

A driven shaft or spindle 13 is provided and is journaled in suitable bearings 14 and 15, which bearings should preferably offer a minimum of frictional resistance to the rotation of the spindle 13.

A coupling member is provided between the drive shaft 10 and the spindle 13 and preferably has a characteristic of slipping under torsion. While a mechanical coupling of the frictional type or a fluid coupling dependent upon the viscosity of the fluid may be employed, one of the preferred forms of a coupling member having the desired characteristics is illustrated in the drawing. This form of coupling member includes a U shaped permanent magnet 16 connected to the shaft 10 for rotation therewith and a metallic conducting disc 17 mounted on the spindle 13. The disc 17 is made of a material which does not greatly inhibit eddy currents or Foucault currents. Rotation of the magnet 16 sets up eddy currents or Foucault currents in the disc 17 so that there is a tendency, as hereinafter referred to, for the disc 17 and the spindle 13 to which it is connected, to rotate.

The structure shown is suitable for apparatus in which the torque on the drive shaft 10 is small. Where higher torques are employed, torque transferring effectiveness of the magnet member 16 may be increased by increasing the number of poles or by providing this member with suitable windings. Similarly if the torque transferring effectiveness of the magnet member 16 is increased, the conducting disc 17 may be changed to take the form of a partially or completely short-circuited wound armature.

A spindle restraining and holding structure is provided and includes a magnet member which in one of the preferred forms is a C-shaped permanent magnet 18. An electromagnet or a multipolar magnet may be used if the torques applied to the driving shaft 10 are higher than could be accommodated by the magnet 18. The permanent magnet 18 which is shown in the drawing includes a horizontal portion 19, to which the bearing 14 may be secured, vertically disposed portions 20 and horizontally disposed portions 21. These latter portions of the magnet 18 have aligned apertures 22 therethrough, internally threaded, to receive adjustable magnetic pole pieces 23 and 24. Each of these pole pieces 23 and 24 includes a portion threaded for engagement with the threaded portion 25 and a terminal pole portion 26.

The other terminal portions 27 of the pole pieces 23 and 24 are preferably provided with slots 28 for the reception of a screw driver or wrench.

The threading of the pole pieces 23 and 24 in the horizontal portions 21 of the magnet 18 provides for adjustment of the position of the pole pieces, 23 and 24, to vary the intensity of the magnetic flux passing between the terminal portions 26 thereof, and lock nuts 30 mounted on the pole pieces 23 and 24 for engagement with the outside end faces of the horizontally disposed portions 21 permit the locking of the pole pieces 23 and 24 in the desired adjusted position.

An armature member 31 is mounted on the spindle 13 for rotation therewith and is mounted to swing between the terminal portions 26 of the adjustable pole pieces 23 and 24. The armature member 31 may be in the form illustrated, and is preferably made of soft iron although a permanent bar magnet or multipolar magnetic devices are suitable for certain types of use where higher torques on the driving member are encountered.

The spindle 13 also has mounted thereon a spindle connector 32, the same being shown as comprising a toothed gear wheel, although any other form of connector may be used if desired. The spindle connector 32 is connected to suitable apparatus (not shown) for indicating, as hereinafter pointed out, that the drive mechanism is exceeding or has exceeded a predetermined speed or for operating control mechanism (not shown) for stopping or reducing the speed of rotation of the drive shaft 10 when a predetermined speed is exceeded or for any other desired purpose.

The operation of the mechanism hereinbefore described will now be pointed out. As stated above, the drive shaft connector 11 is actuated by or from the apparatus whose operation is intended to be indicated or controlled.

The rotation of the drive shaft connector 11 effects rotation of the drive shaft 10 and the magnet or other torque inducing device 16 carried thereon. The rotation of the magnet 16 in proximity to the disc 17 generates eddy currents or Foucault currents in the disc 17 and sets up a tendency in the disc 17 to rotate in synchronism with the magnet 16. Rotation of the disc 17 is restrained by reason of the action of other portions of the structure.

The magnetic circuit of the C-shaped magnet 18 includes the gap between the terminal portions 26 of the magnet and is bridged in part by the armature member 31 so that the magnetic lines of flux in completing this circuit tend to pass through the armature member 31 which is secured to the spindle 13. The lines of magnetic flux serve to hold the armature member 31 substantially in alignment with the terminal portions 26 of the pole pieces 23 and 24, and the armature member 31 moves to a resultant position which is at a small angle to the shortest effective magnetic path connecting the pole pieces 23 and 24 as shown in Fig. 2.

The rotation of the magnet 16, adjacent the disc 17 sets up eddy currents in the disc and increased speed of the magnet 16 increases the eddy currents set up in the disc 17 until a point is reached where the torque applied to the disc 17 and through the disc 17 to the spindle 13 exceeds that holding the armature member 13 in position, whereupon the spindle 13 will be rotated from the drive shaft 10 through the slip coupling 16, 17. The rotation of the spindle 13 actuates the spindle connector 32 mounted thereon and the movement of this connector 32 may be translated by suitable mechanism (not shown) to give an indication that the predetermined speed of the drive shaft 10 has been exceeded or is being exceeded, or may be translated into a control impulse by apparatus (not shown) for effecting the reduction of the speed of the mechanism actuating the drive shaft 10. The provision of the adjustable pole pieces 23 and 24 permits the variation of the intensity of the magnetic flux flowing between the terminal portions 26, with a resultant change of the limit at which the speed of the drive shaft 10 is effective.

After the spindle 13 has been set in rotation, said rotation will thereafter continue until the device has accomplished its intended purpose.

I claim:

1. In combination, a driving member and a driven member, and means for restraining movement of said driven member until a predetermined speed of rotation of the driving member is reached, said means including a magnetic holding device normally restraining the driven member against rotation, and operating mechanism connecting said members including a slip connection for rotating said driven member continuously after the force of said holding device is overcome by the attainment of said predetermined speed.

2. In combination, a driving member and a rotatable driven member, and means for restraining movement of said driven member until a predetermined speed of said driving member is attained, said means including a holding device releasable by application thereto of a predetermined torque and a torque transmitting connection between said members operative to slip until the release of the holding device is effected and to rotate said driven member continuously from the driving member when the holding device has been so released.

3. In combination, a driving member and a rotatable driven member, and means for restraining movement of said driven member until a predetermined speed of said driving member is attained, said means including a holding member exerting a predetermined holding force and a slip connection between said members operative to rotate said driven member continuously when the predetermined holding force is exceeded.

4. In combination, a driving member and a rotatable driven member, and means for restraining movement of said driven member until a predetermined speed of said driving member is attained and for continuously moving said driven member when the speed of said driving member attains said predetermined speed, said means including a holding device and a slip connection between said members, and means for varying the holding force applied by said holding device.

5. In combination, a rotatable driving member and a rotatable driven member, a magnetic responsive device mounted on said driven member, a source of magnetic flux for normally holding said device against movement, and a torque applying connection between said members for effecting continuous rotation of said driven member when the force exerted by the magnetic flux on the magnetic responsive device is exceeded by the torque applied through said connection.

6. In combination, a rotatable driving member and a rotatable driven member, a magnetic responsive device mounted on said driven member, a source of magnetic flux for normally holding said device against movement, and a torque applying connection between said members for effecting continuous rotation of said driven member when the force exerted by the magnetic flux on the magnetic responsive device is exceeded by the torque applied through said connection, and means for varying the intensity of the magnetic flux.

7. In combination, a magnet having pole pieces, a shaft, a member secured to said shaft between said pole pieces and normally held by said magnet, a drive shaft, and means for driving said first mentioned shaft from said drive shaft, said means including a metallic element mounted on one of said shafts and a magnet mounted on the other of said shafts for rotation with respect to said metallic element, said means for driving being ineffective until a predetermined speed of rotation of the drive shaft is attained and then operative to overcome the force exerted by said magnet on said member and to drive said first mentioned shaft.

FREDERICK T. HOLMES.